(12) United States Patent
Rigaud et al.

(10) Patent No.: US 9,476,619 B2
(45) Date of Patent: Oct. 25, 2016

(54) SUB-COOLING SYSTEM OF A COMPRESSION-REFRIGERATION SYSTEM

(71) Applicant: COLDWAY, Pia (FR)

(72) Inventors: Laurent Rigaud, Pia (FR); Francis Kindbeiter, Pia (FR)

(73) Assignee: COLDWAY, Pia (FR)

( * ) Notice: Subject to any disclaimer, the term of this patent is extended or adjusted under 35 U.S.C. 154(b) by 89 days.

(21) Appl. No.: 14/415,427

(22) PCT Filed: Jul. 16, 2013

(86) PCT No.: PCT/FR2013/000188
§ 371 (c)(1),
(2) Date: Jan. 16, 2015

(87) PCT Pub. No.: WO2014/013145
PCT Pub. Date: Jan. 23, 2014

(65) Prior Publication Data
US 2015/0176875 A1   Jun. 25, 2015

(30) Foreign Application Priority Data
Jul. 17, 2012 (FR) .................................... 12 02025

(51) Int. Cl.
| F25B 29/00 | (2006.01) |
| F25B 17/08 | (2006.01) |
| F25B 27/02 | (2006.01) |
| F25B 40/02 | (2006.01) |

(52) U.S. Cl.
CPC ............. *F25B 29/003* (2013.01); *F25B 17/08* (2013.01); *F25B 27/02* (2013.01); *F25B 40/02* (2013.01); *F25B 2327/001* (2013.01); *Y02T 10/166* (2013.01)

(58) Field of Classification Search
CPC ...... F25B 29/003; F25B 40/02; F25B 27/02; F25B 17/08; F25B 2327/001
See application file for complete search history.

(56) References Cited

U.S. PATENT DOCUMENTS 2,884,768 A * 5/1959 Gould ................... B60H 1/005
165/104.11
5,056,324 A * 10/1991 Haley ................... F25B 29/003
62/115

(Continued)

FOREIGN PATENT DOCUMENTS

| EP | 0 307 296 A1 | 3/1989 |
| EP | 1 391 238 A2 | 2/2004 |

OTHER PUBLICATIONS

International Search Report for PCT/FR2013/000188 dated Sep. 30, 2013.

*Primary Examiner* — Emmanuel Duke
(74) *Attorney, Agent, or Firm* — Sughrue Mion, PLLC

(57) ABSTRACT

The present invention relates to a refrigeration facility and a method for maintaining the temperature of an isothermal enclosure (3) including: a refrigerating unit (5) comprising a compressor (7) driven by a heat engine (8) and an evaporator (13); and a thermochemical cooling system (15) including a vessel (23) containing a liquefied gas capable, after evaporation, of combining with a reactive product, consisting of a mixture of a reactive salt and natural expanded graphite, contained in a reactor (17), the reaction product obtained being capable of being regenerated by a heating means, said cooling system including an evaporator (25) and a condenser (21). The facility is characterized in that: the evaporator (25) of said cooling system is in thermal contact with the refrigerant circuit of the refrigerating unit (5) upstream from the evaporator (13) thereof; the reactor of the cooling system is in thermal contact with a heating means using the heat energy dissipated by the heat engine during the operation thereof; the natural expanded graphite used has an apparent density of 100 to 120 kg/m$^3$; and the weight percentage of the salt in the reactive product is of 50% to 75%.

8 Claims, 2 Drawing Sheets

(56) References Cited

U.S. PATENT DOCUMENTS

Figure 1:
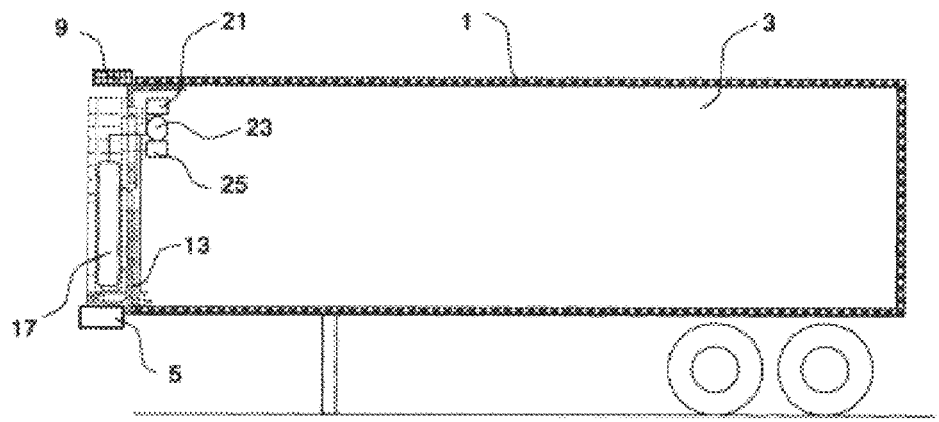

| | | | | |
|---|---|---|---|---|
| 5,107,686 A * | 4/1992 | Howland | ............... | B60H 1/323 62/160 |
| 6,305,186 B1 * | 10/2001 | Py | ............... | F25B 17/08 165/104.12 |
| 7,156,055 B1 * | 1/2007 | Craig | ............... | F01P 3/20 123/41.01 |
| 2008/0199372 A1 * | 8/2008 | Rigaud | ............... | F25B 17/08 422/198 |
| 2015/0027661 A1 * | 1/2015 | Rigaud | ............... | F25B 29/006 165/58 |

* cited by examiner

SUB-COOLING SYSTEM OF A COMPRESSION-REFRIGERATION SYSTEM

CROSS REFERENCE TO RELATED APPLICATIONS

This application is a National Stage of International Application No. PCT/FR2013/000188 filed Jul. 16, 2013, claiming priority based on French Patent Application No. 1202025, filed Jul. 17, 2012, the contents of all of which are incorporated herein by reference in their entirety.

The present invention concerns an installation for refrigerating and maintaining an enclosure at low temperature, particularly composed of an insulated container, particularly of the type placed on a vehicle intended for transporting merchandise required to be kept cold.

It is known that vehicles, such as trucks and tractor-trailers that transport such merchandise, are equipped with a refrigeration device called a refrigeration unit, utilizing a compressor which is driven by a motor, specifically a diesel-type heat engine, usually different from the motor of the vehicle. In a known manner, a cooling liquid is produced by evaporation in an evaporator disposed in the enclosure to be cooled, the gas then being compressed in the compressor in order to be condensed in a condenser disposed outside said enclosure.

It is known that the work load imposed on the refrigeration unit consists of a first step, called the cool-down step in which the insulated container is cooled in order to lower its temperature from the ambient temperature to the desired temperature, and of a second step, called the maintenance step, in which said desired temperature is maintained constant throughout transport.

Experience has shown that the energy demanded by the compressor during the cool-down step constitutes an important part of the total power delivered by the motor that drives it, being on the order of 30% thereof for trucks and 15% for tractor-trailers. A refrigeration unit is thus able to consume, based of course on the specific operating conditions, between three to five liters of fuel per hour. Since the cool-down stage is normally very long, i.e. on the order of three to five hours, this results in various disadvantages.

Firstly, the length of time required to cool down the enclosure and the power demanded by the heat engine result in significant fuel consumption, which in turn results in a high cost of operation, as well as in environmental and noise pollution.

Secondly, the duration of the cool-down constitutes a handicap for the user, in that it requires the extended and unprofitable immobilization of his equipment.

Thirdly, due to the refrigerating power required during the cool-down phase, it is necessary for both the compressor and the motor driving it to be oversized, which is disadvantageous because of the weight, the cost of the equipment, fuel consumption and pollution.

Furthermore, thermochemical cold production systems are known, specifically by patents FR 10.04120 and FR 11.03209 in the name of the applicant, systems which are essentially composed of two elements, namely an evaporator/condenser containing a gas and liquid phase and a reactor containing a reactive salt. Such a thermochemical system functions in two different phases: a cold production phase and a regeneration phase.

During the cold production phase, or low pressure phase, the gas stored in the evaporator/condenser is evaporated, which generates the desired production of cold, and said gas in the gaseous phase reacts during an exothermic reaction on the reactive salt contained in the reactor.

Obviously, in such a system, once the reserve of liquid gas is exhausted, the cold production phase is ended and the system must then be regenerated during the so-called regeneration phase.

At the start of this latter phase, or high pressure phase, the reactor contains a reaction product resulting from combining the gas with the reactive salt. The regeneration operation thus consists of releasing this gas by heating the reaction product contained in the reactor and, once released, it is condensed in the evaporator/condenser. The thermochemical system is then available again for a new cycle of cold production.

Also known by patent EP 1 391 238 is a water-zeolite adsorption system in which the condenser of the refrigeration circuit of a vehicle air-conditioning system is cooled, which makes it possible to increase the refrigerating power thereof. It is known that such an adsorption system does not allow evaporation below a temperature of 5° C., thus limiting the power of the system, making it inappropriate for the present application in which a power on the order of 4 kW must be available.

An object of the present invention is to propose an installation for producing and maintaining cold that makes it possible to avoid the various aforementioned disadvantages of the prior art, and which is capable of delivering the aforementioned power.

An object of the present invention is therefore an installation for refrigerating and maintaining at temperature an insulated enclosure, comprising:

a refrigeration unit having a compressor driven by a heat engine, a refrigerant circulation circuit, a pressure reducing valve, a condenser and an evaporator and, a thermochemical type cooling system comprising a reservoir containing a liquefied gas that is suitable, after evaporation, for being combined with a reactive product composed of a mixture of a reactive salt and expanded natural graphite contained in a reactor, said combination being accomplished according to an exothermic thermochemical reaction, the reaction product obtained being capable of being regenerated by heating means by releasing said gas according to an inverse thermochemical reaction, said cooling system comprising an evaporator and a condenser, characterized in that:

the evaporator of said cooling system is in thermal contact with the refrigerant circuit of the refrigeration unit upstream from the evaporator thereof, the reactor of the cooling system is in thermal contact with heating means utilizing calorific energy dissipated by the heat engine during its operation, the apparent density of the graphite used is between 100 and 120 kg/m$^3$, the proportion by mass of the salt in the reactive product is between 50% and 75%.

Said thermal contact can be advantageously obtained by means of a heat exchanger, particularly a liquid/liquid-type exchanger, and said exchanger will preferably be constituted by the evaporator of the thermochemical system.

The reactor may have a duct passing through it that is connected to the exhaust of the heat engine.

The heating means may also be constituted by the water or oil cooling system of the heat engine.

An object of the present invention is also a method of refrigerating and maintaining at temperature an insulated enclosure comprising essentially two steps: a step of cooling to a specific desired temperature of said enclosure, and a step of maintaining said enclosure at said desired temperature, implementing an installation comprising:
- a refrigeration unit comprising a compressor driven by a heat engine, a refrigerant circulation circuit, a pressure reducing valve, a condenser and an evaporator and,
- a thermochemical-type cooling system comprising a reservoir containing a liquefied gas capable, after evaporation, of being combined with a reactive product contained in a reactor and which is composed of a mixture of a reactive salt and expanded natural graphite, the apparent density of the latter being between 100 and 120 kg/m$^3$ and the proportion by mass of the salt in the reactive product being between 50% and 75%, said combination being accomplished according to an exothermic thermochemical reaction, the reaction product obtained being capable of being regenerated by heating while releasing said gas according to an inverse thermochemical reaction, wherein:
   during the cooling step, the refrigerant of the refrigeration unit is cooled by a thermochemical cooling system before it enters the evaporator,
   the reaction product is heated by means of the heat released by the heat engine.

Figure 3:
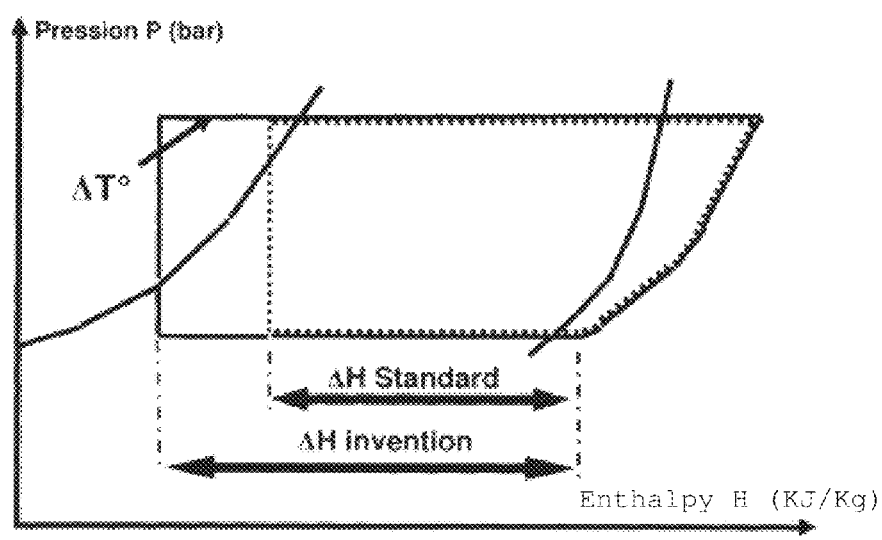
Figure 2:
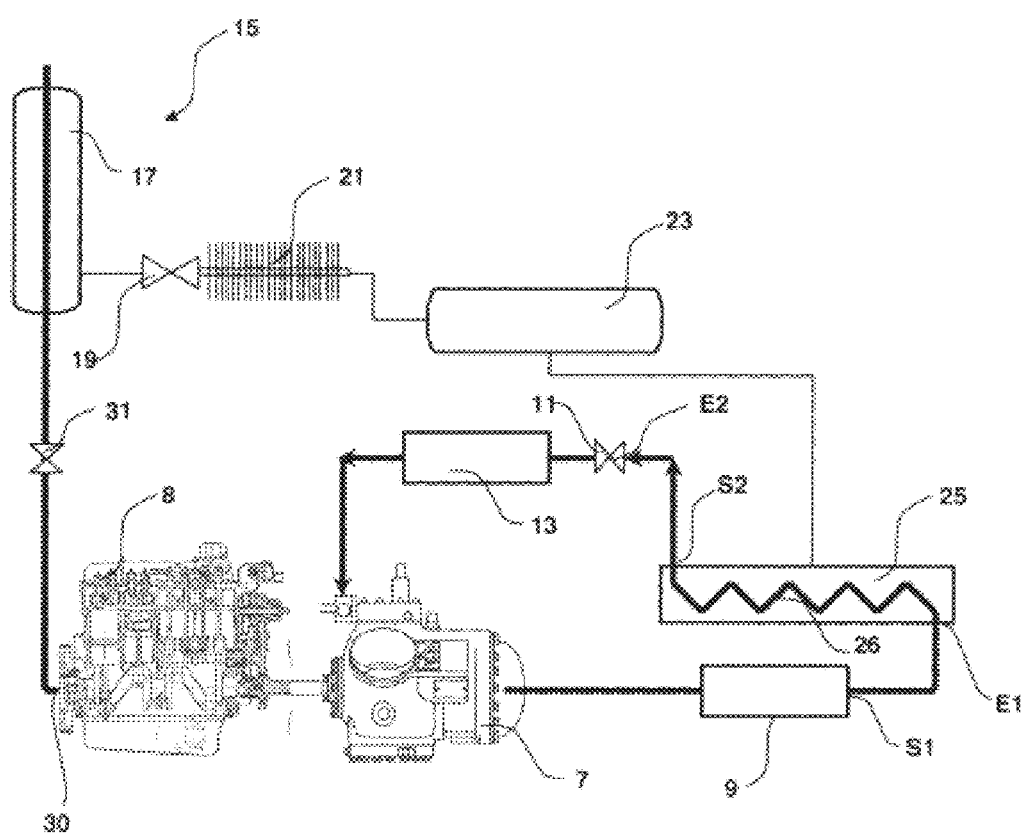

Described hereinafter, by way of a non-limiting example, is an embodiment of the present invention with reference to the appended drawings in which:

FIG. 1 is an overall schematic view of the trailer of a tractor-trailer vehicle equipped with an installation for cooling and maintaining at temperature according to the invention, FIG. 2 is a schematic view of an installation according to the invention, FIG. 3 is a diagram representing the cooling cycle of a refrigeration unit according to the prior art and of a refrigeration unit according to the invention, respectively.

Represented in FIG. 1 is a trailer 1 of a tractor-trailer, the internal volume of which constitutes a refrigerated container 3, specifically intended for the transport of perishable goods. Said trailer 1 is provided with a refrigeration unit 5 of the conventional compressor type, represented diagrammatically in detail in FIG. 2.

Said refrigeration unit thus comprises a compressor 7 driven by a diesel engine 8 and is connected to a refrigerant circuit passing through a condenser 9, a pressure reducing valve 11 and an evaporator 13, which is disposed in the refrigerated container 3.

The refrigeration installation according to the invention also includes cooling means, which are composed of a thermochemical system 15 which, in a known manner, comprises a circuit formed successively by a reactor 17, which is disposed outside the container 3, an electromagnetic valve 19, a condenser 21, a reservoir 23 containing a gas in gaseous phase, and an evaporator 25 which are disposed in the container 3.

According to the invention the evaporator 25 is produced in the form of an exchanger which has a coil 26 passing through it, the input E1 of which is connected to the output S1 of the condenser 9 of the refrigeration unit 5 and the output S2 is connected to the input E2 of the pressure reducing valve 11 of said unit, disposed upstream from the evaporator 13.

In a known manner the reactor 17 encloses a reactive product which is formed from a mixture of a salt composed, in the present implementation of the invention, of manganese chloride, with a matrix binder composed in this instance of expanded natural graphite. According to the invention it was found that, in order to release sufficient energy quickly enough for the present application, the apparent density of the natural graphite used should be between 100 kg/m$^3$ and 120 kg/m$^3$, and the proportion by mass of the salt in the reactive product must be between 50% and 75%.

In this way the heat transfers and diffusion of the gas in the reactive product are optimized. The present parameters enable the reactor on the one hand to more easily extract the reaction heat released during the thermochemical reaction, and on the other hand to absorb and desorb more quickly the gas, resulting in higher flow rates of evaporated gas and thus greater power of the thermochemical system.

Apparent density will be understood as the density at which the volume of expanded natural graphite is the volume occupied by the graphite itself, to which should be added the volume of the interstices between the grains of graphite.

During the cold production phase, called the absorption phase, said reactive product is capable of reacting with the gas in the gaseous phase coming from the reservoir 23, particularly ammonia, in order to generate a reaction product during an exothermic thermochemical reaction, and during a phase called regeneration, capable of restoring the reaction product by heating the previously absorbed gas during an inverse thermochemical reaction.

Other salts could also be used as reactive product, in particular salts such as nickel chloride or iron chloride.

It will be understood that the liquid gas leaving the reservoir 23 generates the cold while it is held in the evaporator 25, and that the gas absorbed by the reactive product generates the heat due to the exothermic thermochemical reaction in the reactor 17. It is the cold produced in the evaporator 25 which, according to the invention, is used to quickly cool the refrigerant of the refrigeration unit upstream from its evaporator 13.

The implementation and management of the operation of the installation according to the invention are provided, for example, by means of a microcontroller, not shown in the drawings.

Before the insulated container 3 is put into use, the temperature thereof is adjusted to the desired value by means of the thermochemical system 15.

To that end, during a specific period of time, which is on the order of one hour and which depends in particular on the volume of the container 3, the desired temperature and the power of the cooling installation, the management means thereof activate the operation of the thermochemical system and the refrigeration unit 5. It will be understood that, under these conditions, the thermochemical system, which has the advantage of generating cold nearly instantaneously in the exchanger 25, lowers the temperature of the refrigerant of the refrigeration unit 5 which passes through the coil 26 disposed therein.

Thus, according to the invention, the operating conditions of the refrigeration unit 5 are modified with respect to its normal operation, since the temperature of the refrigerant that enters the evaporator 13, which is normally on the order of 40° C., is now lowered to a value of between −20° C. and 20° C. and is preferably on the order of 0° C.

It will be understood that, under these conditions, the operating cycle of the refrigeration unit is significantly modified. Represented in FIG. 3, by way of comparison, on the one hand is an operating cycle of a refrigeration unit according to the prior art (in dotted lines) in which the refrigerant enters the evaporator 13 at a temperature of 35° C., and on the other hand the same operating cycle of a refrigeration unit modified according to the invention (in solid lines) in which the refrigerant enters the evaporator at a temperature of 0° C. It will be noted in this figure that the lowering of the temperature of the refrigerant upstream from the evaporator 13 has the effect of increasing the evaporation enthalpy ΔH, and as a result the cold production power of the refrigeration installation.

Once the cool-down step is completed, i.e. when the temperature of the refrigerated container 3 reaches the specific desired temperature, the management system of the refrigeration installation stops the operation of the thermochemical system and implements the regeneration step thereof.

It is known that such a regeneration step consists of heating the reaction product formed in the reactor 17 during the absorption phase, so as to activate the inverse thermochemical reaction during which the gas is released.

Said heating can be accomplished by different means, and particularly by means of an electric heating sleeve surrounding the reactor.

In a particularly advantageous implementation of the invention, represented in FIG. 2, such heating is accomplished with the heat generated by the heat engine 8 when it drives the compressor 7 of the refrigeration unit.

To that end, and as represented in FIG. 2, the exhaust 30 from the heat engine 8 is connected to the reactor 8 through an electromagnetic valve 31 and passes through the reactor 17. Thus, during the cold production phase of the thermochemical system, the microprocessor maintains the electromagnetic valve 31 in the closed position and changes it to the open position during the regeneration phase, which then allows the exhaust gases from the engine 8 to reheat the reaction product contained in the reactor 17 and to release the gas trapped in said product.

Such an implementation is advantageous in that it has a particularly simple structure and also makes it possible to achieve substantial energy savings for the energy spent in regenerating the thermochemical system.

It would also be possible to use the fluids from the engine, which are carried at high temperature during the operation thereof, to accomplish the regeneration of the reactive product.

The present invention is therefore particularly advantageous for various reasons.

Firstly, for the same specific required cold power, it allows a refrigeration unit to be used having far lower power than that which is used according to the prior art, in that the power necessary for the cool-down step is provided by the thermochemical system.

The power savings achieved is even greater, since the step of regenerating the thermochemical system is provided "free of charge" by the heat generated by the heat engine of the refrigeration unit during its operation.

It is therefore possible, and at equal desired power of the installation, to reduce the power of the refrigeration unit and thus the size and cost thereof, as well as the cost related to its fuel consumption.

Secondly, it makes it possible to reduce the duration of the step of cooling down the refrigerated container, since the cold furnished by the thermochemical system is immediately available, thus gaining precious time for the user during the cool-down step.

Finally, by decreasing the power of the refrigeration unit it makes it possible to achieve an important gain with respect to the weight and space required.

Thirdly, it makes it possible to decrease the pollution emitted by the heat engine driving the compressor, on the one hand due to the lower power thereof, and on the other hand due to its reduced operating time during the cool-down phase.

The invention claimed is:

1. Installation for refrigerating and maintaining at temperature an insulated enclosure, comprising:
   a refrigeration unit having a compressor driven by a heat engine, a refrigerant circulation circuit, a pressure reducing valve, a condenser and an evaporator and,
   a thermochemical-type cooling system comprising a reservoir containing a liquefied gas suitable, after evaporation, for being combined with a reactive product composed of a mixture of a reactive salt and expanded natural graphite contained in a reactor, said combination being accomplished according to an exothermic thermochemical reaction, the reaction product obtained being capable of being regenerated by heating means by releasing said gas according to an inverse thermochemical reaction, said cooling system comprising an evaporator and a condenser, wherein:
   the evaporator of said cooling system is in thermal contact with the refrigerant circuit of the refrigeration unit upstream from the evaporator thereof,
   the reactor of the cooling system is in thermal contact with heating means utilizing calorific energy dissipated by the heat engine during its operation,
   the apparent density of the graphite used is between 100 and 120 kg/m$^3$,
   the proportion by mass of the salt in the reactive product is between 50% and 75%.

2. Installation for refrigerating and maintaining at temperature an insulated enclosure according to claim 1, wherein the thermal contact is obtained by means of a heat exchanger.

3. Installation for refrigerating and maintaining at temperature an insulated enclosure according to claim 2, wherein the exchanger is a liquid/liquid type.

4. Installation for refrigerating and maintaining at temperature an insulated enclosure according to claim 2, wherein said exchanger is constituted by the evaporator of the thermochemical system.

5. Installation for refrigerating and maintaining at temperature an insulated enclosure according to claim 1, wherein the heating means are constituted by the exhaust gases from the heat engine.

6. Installation for refrigerating and maintaining at temperature an insulated enclosure according to claim 5, wherein a duct connected to the exhaust of the heat engine passes through the reactor.

7. Installation for refrigerating and maintaining at temperature an insulated enclosure according to claim 1, wherein the heating means are constituted by the water or oil system of the heat engine.

8. Method of refrigerating and maintaining at temperature an insulated enclosure comprising essentially two steps, i.e. a step of cooling to a specific desired temperature of said enclosure, and a step of maintaining said enclosure at said desired temperature, implementing an installation comprising:
   a refrigeration unit comprising a compressor driven by a heat engine, a refrigerant circulation circuit, a pressure reducing valve, a condenser and an evaporator and,
   a thermochemical type cooling system comprising a reservoir containing a liquefied gas capable, after evaporation, of being combined with a reactive product contained in a reactor, and which is composed of a mixture of a reactive salt and expanded natural graphite, the apparent density of the latter being between 100 and 120 kg/m³ and the proportion by mass of the salt in the reactive product being between 50% and 75%, said combination being accomplished according to an exothermic thermochemical reaction, the reaction product obtained being capable of being regenerated by heating while releasing said gas according to an inverse thermochemical reaction, wherein:

during the cooling step, the refrigerant of the refrigeration unit is cooled by a thermochemical cooling system before it enters the evaporator, the reaction product is heated by means of the heat released by the heat engine.

\* \* \* \* \*